US012552127B2

(12) United States Patent
Boegli et al.

(10) Patent No.: US 12,552,127 B2
(45) Date of Patent: Feb. 17, 2026

(54) EMBOSSING SYSTEM WITH EMBOSSING CASSETTE

(71) Applicant: Boegli-Gravures SA

(72) Inventors: Charles Boegli, Marin-Epagnier (CH); Alain Droz, Thielle (CH); Felix Lustenberger, Marin-Epagnier (CH); Gabriel Dumitru, Nussbaumen (CH)

(73) Assignee: BOEGLI-GRAVURES SA, Marin-Epagnier (CH)

( * ) Notice: Subject to any disclaimer, the term of this patent is extended or adjusted under 35 U.S.C. 154(b) by 0 days.

(21) Appl. No.: 17/610,171

(22) PCT Filed: Jan. 13, 2021

(86) PCT No.: PCT/IB2021/050220
§ 371 (c)(1),
(2) Date: Nov. 10, 2021

(87) PCT Pub. No.: WO2021/144709
PCT Pub. Date: Jul. 22, 2021

(65) Prior Publication Data
US 2022/0347962 A1 Nov. 3, 2022

(30) Foreign Application Priority Data

Jan. 17, 2020 (EP) .................... 20152524

(51) Int. Cl.
*B31F 1/07* (2006.01)
*B29C 59/04* (2006.01)

(52) U.S. Cl.
CPC .............. *B31F 1/07* (2013.01); *B29C 59/04* (2013.01); *B31F 2201/0753* (2013.01); *B31F 2201/0776* (2013.01)

(58) Field of Classification Search
CPC ................ B31F 1/07; B31F 2201/0753; B31F 2201/0776; B31F 1/10; B31F 2201/0779;
(Continued)

(56) References Cited

U.S. PATENT DOCUMENTS 2,681,611 A * 6/1954 Jacobs ...................... B31F 1/07
101/23
4,248,074 A 2/1981 Fuhrmann et al.
(Continued)

FOREIGN PATENT DOCUMENTS

AU 772613 B 1/1913
AU 772613 B2 5/2004
(Continued)

OTHER PUBLICATIONS

Espacenet translation of EP 1721742 A2 (published 2006), listed in IDS Nov. 11, 2021 (Year: 2006).*
(Continued)

Primary Examiner — Susan D Leong
Assistant Examiner — Jennifer L Groux
(74) Attorney, Agent, or Firm — NIXON & VANDERHYE

(57) ABSTRACT

An embossing system, comprising an embossing frame, and an embossing cassette. The embossing cassette comprises at least 2 rollers, and a body configured to hold the at least 2 rollers, whereby the at least 2 rollers are removably mounted in the body. The embossing frame is configured to removably house the embossing cassette, and the embossing frame comprises an embossing-frame positioning means configured to cooperate with a corresponding body-positioning means of the embossing cassette at a time when the embossing cassette is housed in the embossing frame, to position the embossing cassette in a predetermined position inside of the embossing frame. The embossing system further comprises
(Continued)

a plurality of means for adjusting and correcting a position of a rotation axis of the corresponding roller inside the body, a location of each of the means for adjusting and correcting being at one of each end of the at least 2 rollers, and the plurality of means for adjusting and correcting being configured to adjust and correct in at least two of the following: in an axial direction of the corresponding roller, In one of the 2 dimensions of a plane perpendicular to the axial direction, and the embossing frame is further configured to render the plurality of means for adjusting and correcting the position of the rotation axis inaccessible from an outside of the embossing frame at a time when the embossing cassette is housed Inside the embossing frame.

17 Claims, 10 Drawing Sheets

(58) Field of Classification Search
CPC . B29C 59/043; B29C 2059/023; B29C 55/18; B29C 59/04–046; B44B 5/0047; B44B 5/0009; B21B 31/02; B31B 50/256; B31B 50/88; D21G 1/0026
See application file for complete search history.

(56) References Cited

U.S. PATENT DOCUMENTS

| | | | | |
|---|---|---|---|---|
| 4,732,082 A * | 3/1988 | Ireton | | B41F 19/02 101/23 |
| 4,735,116 A * | 4/1988 | Ginzburg | | B21B 13/023 72/247 |
| 5,007,271 A * | 4/1991 | Boegli | | B21D 13/04 72/196 |
| 5,590,557 A | 1/1997 | Keller et al. | | |
| 5,598,774 A | 2/1997 | Boegli | | |
| 6,176,819 B1 | 1/2001 | Boegli | | |
| 6,665,998 B1 * | 12/2003 | Boegli | | B31F 1/07 493/364 |
| 6,715,411 B1 | 4/2004 | Boegli | | |
| 7,036,347 B2 | 5/2006 | Boegli | | |
| 7,147,453 B2 | 12/2006 | Boegli | | |
| 7,229,681 B2 | 6/2007 | Boegli | | |
| 8,038,922 B2 | 10/2011 | Boegli | | |
| 8,430,663 B2 | 4/2013 | Boegli | | |
| 8,495,900 B2 | 7/2013 | Boegli | | |
| 8,932,044 B2 | 1/2015 | Boegli | | |
| 9,140,834 B2 | 9/2015 | Boegli | | |
| 9,156,107 B2 | 10/2015 | Boegli | | |
| 9,180,643 B2 | 11/2015 | Boegli | | |
| 9,481,141 B2 | 11/2016 | Boegli | | |
| 9,505,167 B2 | 11/2016 | Boegli | | |
| 9,579,924 B2 | 2/2017 | Boegli | | |
| 9,636,885 B2 | 5/2017 | Boegli | | |
| 9,809,927 B2 | 11/2017 | Boegli | | |
| 9,939,725 B2 | 4/2018 | Boegli | | |
| 9,993,895 B2 | 6/2018 | Boegli | | |
| 10,083,253 B2 | 9/2018 | Boegli | | |
| 10,183,318 B2 | 1/2019 | Boegli | | |
| 2002/0130463 A1 | 9/2002 | Michel | | |
| 2003/0139274 A1 * | 7/2003 | Cipolli | | B23D 35/008 493/434 |
| 2005/0119099 A1 * | 6/2005 | Madern | | B23D 35/008 493/144 |
| 2005/0279147 A1 | 12/2005 | Boegli | | |
| 2005/0280182 A1 | 12/2005 | Boegli | | |
| 2010/0061619 A1 | 3/2010 | Boegli | | |
| 2012/0018993 A1 | 1/2012 | Boegli | | |
| 2012/0292821 A1 | 11/2012 | Boegli | | |
| 2014/0059977 A1 | 3/2014 | Boegli | | |
| 2016/0008998 A1 * | 1/2016 | Dénisse | | B31F 1/07 83/887 |
| 2016/0016324 A1 * | 1/2016 | Bapst | | B26F 1/384 29/401.1 |
| 2016/0075077 A1 | 3/2016 | Boegli | | |
| 2017/0066079 A1 | 3/2017 | Reisse | | |
| 2017/0282635 A1 | 10/2017 | Boegli | | |
| 2018/0220698 A1 | 8/2018 | Boegli | | |
| 2018/0370175 A1 | 12/2018 | Boegli | | |
| 2020/0086600 A1 | 3/2020 | Boegli | | |
| 2020/0324505 A1 | 10/2020 | Boegli | | |
| 2021/0129478 A1 | 5/2021 | Boegli | | |
| 2021/0154964 A1 | 5/2021 | Boegli | | |
| 2021/0237199 A1 | 8/2021 | Boegli | | |
| 2021/0260633 A1 | 8/2021 | Boegli | | |
| 2021/0276298 A1 | 9/2021 | Boegli | | |

FOREIGN PATENT DOCUMENTS

| | | | |
|---|---|---|---|
| CA | 2382597 A1 | 11/2000 | |
| CA | 2367423 C | 5/2008 | |
| DE | 8660031 U1 | 2/1989 | |
| DE | 10212172 A1 | 9/2002 | |
| DE | 10212175 A1 | 10/2002 | |
| DE | 202017105458 U1 | 10/2017 | |
| EP | 0244492 * | 5/1986 | |
| EP | 1721742 A2 | 11/2006 | |
| EP | 2327502 A1 | 6/2011 | |
| EP | 2327503 A1 | 6/2011 | |
| EP | 2572820 A1 | 3/2013 | |
| EP | 2653301 A1 | 10/2013 | |
| EP | 3300612 A1 | 4/2018 | |
| EP | 3415306 A1 | 12/2018 | |
| WO | 2007012215 A1 | 2/2007 | |
| WO | WO 2007012215 | 2/2007 | |
| WO | WO-2008043497 A1 * | 4/2008 | B26D 7/2628 |

OTHER PUBLICATIONS

Espacenet machine translation of EP 0244492 A1, Hiedemann (Year: 1986).*
Office Action issued in Indian Patent Application No. 202117057148 dated Aug. 23, 2022.
International Search Report mailed on Jun. 7, 2021 for Application N° PCT/IB2021/050220.
Written Opinion of the ISA mailed on Jun. 7, 2021 for Application N° PCT/IB2021/050220.
Office Action, issued in Korean Patent Application No. 10-2025-7006505 dated Nov. 10, 2025.

* cited by examiner

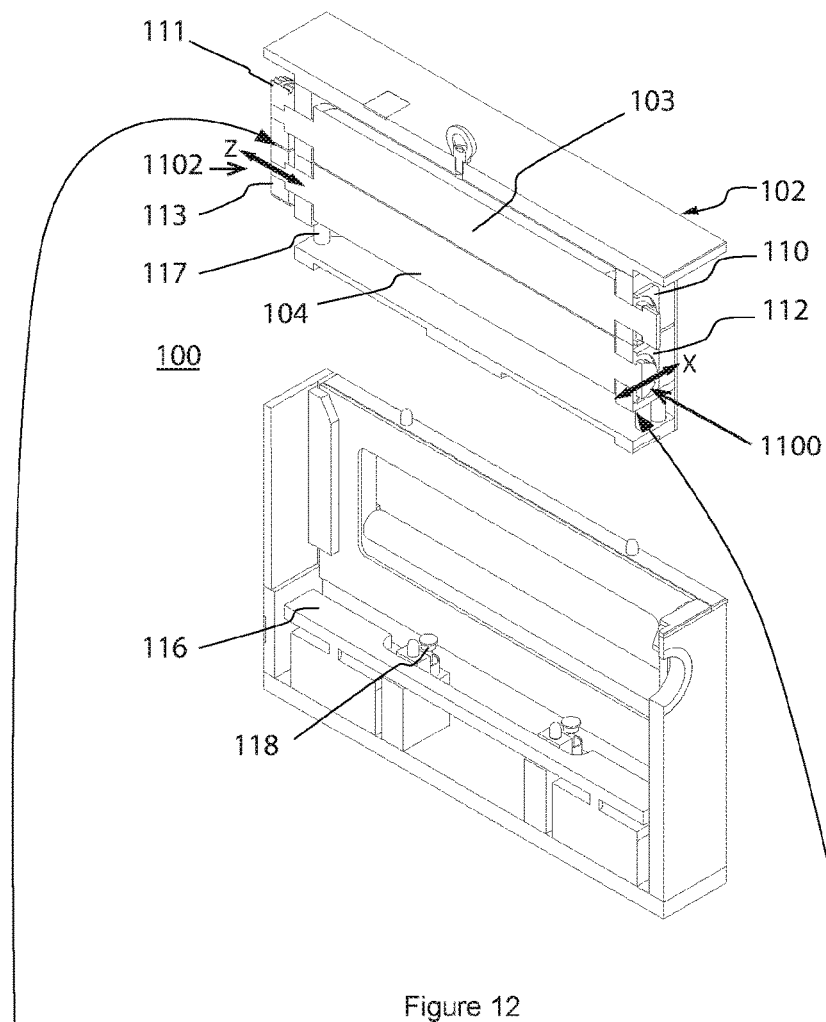
Figure 12
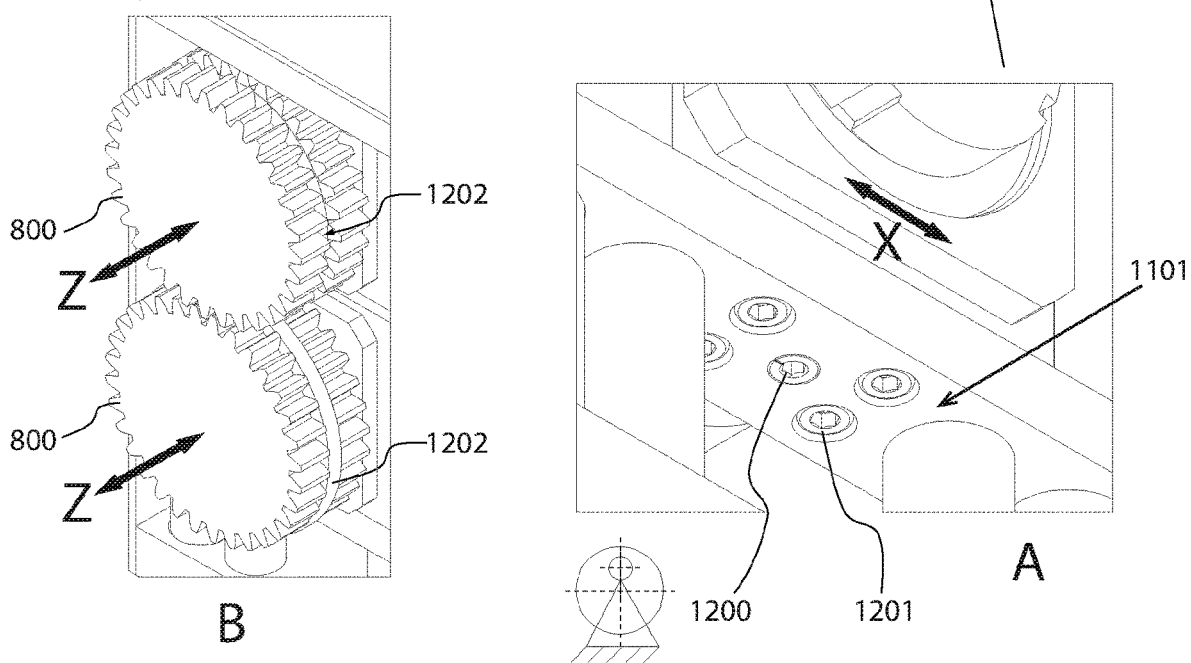

EMBOSSING SYSTEM WITH EMBOSSING CASSETTE

CROSS REFERENCE TO RELATED APPLICATIONS

The present application is a United States national stage application of International patent application PCT/IB2021/050220 filed on Jan. 13, 2021 designating the United States, and claims foreign priority to European patent application EP20152524.3 filed on Jan. 17, 2020, the contents of both documents being herewith incorporated by reference in their entirety.

TECHNICAL FIELD

The invention is in the field of embossing web material, and more particularly online embossing.

BACKGROUND

DE10212172A1 describes a system that comprises at least one embossing cassette having two counter-rotating embossing rollers. The embossing cassettes are arranged on a support plate and may be slid in pre-defined grooves of the plate from a working position into a rest position. At least one exchange embossing cassette lies on the plate in an exchange position so that it may be exchanged with the working embossing cassette in the working position. Further, at least one reserve embossing cassette slidably lies on the support plate in a reserve position so that it may be exchanged with the exchange embossing cassette in the exchange position. The system of DE10212172A1 enables a quick exchange of an embossing cassette by manual sliding with the exchange embossing cassette in the exchange position. However, this document fails to mention any pre-alignment of the rollers in the embossing cassette, nor any circumstance under which this would be done. The system described therein implies a comparatively large footprint for its implementation. The system further requires several assembly steps from a qualified operator, such as for example fastening the embossing cassette, clutching the powering, mounting the pressure gear. Furthermore, the document fails to indicate any information about the precision on the alignment and positioning tolerances for the rollers and the embossing cassette, nor does it disclose any method to adjust these.

EP1721742A2 describes a system that comprises an embossing cassette having two counter-rotating embossing rollers. The embossing rollers are mounted in a body by means of holding devices, which are configured such that one roller may be moved inside the embossing cassette along the direction of its rotation axis and such to allow a relative positioning amongst the rotation axes of the rollers around a tilt axis that is perpendicular to the rotation axes. The alignment of the embossing rollers is done while the embossing cassette is mounted in the production line. However, this document fails to mention any pre-alignment of the rollers in the embossing cassette before this is introduced in the production line, nor any circumstance under which this would be done. The system further requires several assembly steps from a qualified operator, such as positioning and aligning of the embossing rollers inside the embossing cassette in the production environment. Furthermore, the document fails to indicate any information about the precision on the alignment and positioning tolerances for the rollers and the embossing cassette, nor does it disclose any method to adjust these.

U.S. Pat. No. 6,665,99 B1 describes exchangeable embossing rollers that are disposed in suitable interchangeable embossing cassettes for embossing systems. An embossing cassette may for example take the form of a body having its ends provided with fitting surfaces. The mount or embossing frame of an embossing systems comprises corresponding seats, which are very precisely adapted to the actual embossing cassette. In the inserted condition, i.e., when the fitting surfaces of the retaining elements are inserted into the associated seats, the embossing rollers contained in the embossing cassette are thus placed in their operational position without requiring any further adjusting operations. Particularly, the driven embossing rollers of such an embossing system are thus substantially less complicated to exchange, thereby allowing quick maintenance and production changeovers.

It has been found that the embossing cassette and its embossing frame as known from prior art may indeed not require any further adjusting operation for the embossing rollers, but that this turns out not to be sufficient in case the rollers become comparatively long, and as a consequence also become heavier. Furthermore, the system described in the prior art operates at a pre-defined contact pressure between the embossing rollers and does not enable the use of any differential pressure. Hence, there is the need for a system and corresponding adjustment method for an embossing cassette that is designed for comparatively large embossing rollers, particularly for online embossing.

The invention addresses these and further problems.

SUMMARY OF THE INVENTION

In a first aspect, the invention provides an embossing system, comprising an embossing frame, and an embossing cassette. The embossing cassette comprises at least 2 rollers, and a body configured to hold the at least 2 rollers, whereby the at least 2 rollers are removably mounted in the body. The embossing frame is configured to removably house the embossing cassette, and the embossing frame comprises an embossing-frame positioning means configured to cooperate with a corresponding body-positioning means of the embossing cassette at a time when the embossing cassette is housed in the embossing frame, to position the embossing cassette in a predetermined position inside of the embossing frame. The embossing system further comprises a plurality of means for adjusting and correcting a position of a rotation axis of the corresponding roller inside the body, a location of each of the means for adjusting and correcting being at one of each end of the at least 2 rollers, and the plurality of means for adjusting and correcting being configured to adjust and correct in at least two of the following: in an axial direction of the corresponding roller, in one of the 2 dimensions of a plane perpendicular to the axial direction, and the embossing frame is further configured to render the plurality of means for adjusting and correcting the position of the rotation axis inaccessible from an outside of the embossing frame at a time when the embossing cassette is housed inside the embossing frame.

In a preferred embodiment, the plurality of means for adjusting and correcting comprise an off-centered pin device configured to adjust the position of the rotation axis at one of the at least one of each end of the at least 2 rollers, in a first one of the 2 dimensions, and at the opposite end of the concerned roller a fixed rotation center, which is configured to enable the rotation axis to rotate around the fixed rotation center around an axis perpendicular to the rotation axis.

In a further preferred embodiment, the plurality of means for adjusting and correcting further comprises at one of the ends of one of the at least two rollers, a notch-disk adjustment mechanism configured to adjust the position of the rotation axis of the corresponding roller in axial direction.

In a further preferred embodiment, the plurality of means for adjusting and correcting further comprises a handlebar system coupled to each end of one of the rollers, and an actuation mechanism configured to actuate the handle bar system to adjust a position of the one of the rollers in a second one of the 2 dimensions.

In a further preferred embodiment, the plurality of means for adjusting and correcting is at least partly mounted of the body of the embossing cassette.

In a further preferred embodiment, the embossing frame further comprises a guiding means configured to guide the embossing cassette during an insertion of the embossing cassette into the embossing frame, in order for the body-positioning means to cooperate with the embossing-frame positioning means.

In a further preferred embodiment, the guiding means comprises at least a slanted surface configured to slide on a counterpart element of the embossing cassette during the insertion of the embossing cassette into the embossing frame.

In a further preferred embodiment, the guiding means, the body-positioning means, and the embossing-frame positioning means are configured to achieve the predetermined position inside of the embossing frame with a tolerance in a range between 0.02 mm and 0.06 mm.

In a further preferred embodiment, the embossing system further comprises at least one hydraulic or pneumatic jack mounted inside of the embossing frame, the at least one hydraulic or pneumatic jack being configured to adjust a counter pressure between the at least 2 rollers.

In a further preferred embodiment, the embossing frame comprises at least a first and a second individually removably fixed wall, each respectively enabling an introduction into and removal from the embossing frame of the embossing cassette on the side of the first or second wall.

In a further preferred embodiment, the embossing frame comprises a machine coupling configured to couple a drive system to the embossing cassette, thereby enabling at least one of the 2 rollers in the embossing cassette to be driven.

In a second aspect, the invention provides an embossing cassette comprising at least 2 rollers, a body configured to hold the at least 2 rollers, whereby the at least 2 rollers are removably mounted in the body. The embossing cassette comprises a plurality of means for adjusting and correcting a position of a rotation axis of the corresponding roller inside the body, a location of each of the means for adjusting and correcting being at one of each end of the at least 2 rollers, and the plurality of means for adjusting and correcting being configured to adjust and correct in at least two of the following: in an axial direction of the corresponding roller inside the body, in one of 2 dimensions of a plane perpendicular to the axial direction.

In a further preferred embodiment, the plurality means for adjusting and correcting is at least partly mounted of the body of the embossing cassette.

In a further preferred embodiment, the at least 2 rollers have a length comprised between 100 mm and 5000 mm.

In a further preferred embodiment, the at least 2 rollers are configured for embossing web material.

In a further preferred embodiment, the at least 2 rollers are heated rollers.

In a third aspect, the invention provides a method for an off-line adjustment of an embossing cassette, at least comprising steps of isolating the embossing cassette from an online production chain, such that it is in offline status, positioning at least a first and a second embossing roller in a body of the embossing cassette, adjusting and correcting a position of at least one of each of the at least first and second embossing rollers mounted in the body of the embossing cassette, by actuating a plurality of adjusting and correcting means at at least one of each end of the first and the second embossing roller and thereby adjusting a position of a rotation axis in at least two of the following: in an axial direction, in at least one of 2 dimensions of a plane perpendicular to the axial direction.

In a further preferred embodiment, the method further comprises housing the embossing cassette inside an embossing frame of the online production chain, thereby concealing the plurality of adjusting and correcting means from an outside of the embossing frame.

BRIEF DESCRIPTION OF THE FIGURES

The invention will be better understood through the detailed description of preferred embodiments of the invention, and in reference to the appended figures, wherein FIG. 1 schematically illustrates an example embodiment of an embossing system according to the invention in a sectional view, FIG. 2 schematically represents an extremity of a first roller and its rotation axis according to the invention, FIG. 3 schematically illustrates a further example of an embossing system according to the invention, FIG. 4 schematically illustrates the example of FIG. 3, assembled and closed with a lateral door, this view being deprived of one lateral wall, thus enabling to look inside, FIG. 5 schematically illustrates an alternative manner of introducing the embossing cassette into the embossing frame, according to the invention.

DETAILED DESCRIPTION OF PREFERRED EMBODIMENTS OF THE INVENTION

Prior art integration of embossing cassette and embossing frame are showing to be impractical when wanting to emboss on a width for example larger than 500 mm. A reason for this is that the prior art system becomes too heavy to handle by the end user. During manipulation, a high risk of misalignment of the rollers exists. Each roller may exceed for example 100 kg of mass. Hence a hydraulic or pneumatic jack used may be necessary to press the rollers toward each other for embossing, and such hydraulic or pneumatic jack must be dimensioned accordingly and may not anymore be included in the prior art integration.

The invention relates to an embossing system comprising an embossing cassette and an embossing frame.

The embossing cassette denotes a device that may also be referenced as an embossing head. The embossing system may be constructed in such a way, that the embossing cassette comprises at least 2 embossing rollers and provides a possibility to adjust the embossing rollers in order to assure the parallelism of their axes amongst each other.

The embossing frame denotes a device that is configured to house the embossing cassette. The embossing system may further be constructed in such a way, that the embossing frame supports the embossing cassette and optionally includes a servo-drive for the at least 2 embossing rollers.

The embossing system according to the invention is most suitable to be used in online embossing, i.e., in a production chain where for example over 1000 sections/min are embossed.

The here described embossing system is appropriate for the fine embossing of thin foils or thin packaging foils having a thickness in an approximate range from 10 μm to 800 μm using the rotational process. It is well known in the food industries, pharmaceuticals, tobacco industry, luxury, and so on, to emboss thin packaging foils using rotational embossing rollers. Such thin packaging foils may be intended to be wrapped around a bunch of cigarettes or reduced risk tobacco products, or to be used as packaging material for coffee or tea tabs, for chocolate, butter or similar food products, as well as in pharmaceuticals, fragrances, electronics, jewelry or watches. The embossed thin foil may for example be any one of the list comprising a metal foil, a metal foil laminated with organic substrates, a plastic film laminated with organic substrates such as paper, a polymer film laminated with organic substrates such as paper, a metallized paper, a metallized polymer film, a polymer film, a hybrid polymer film, or hybrids in general.

Figure 1:
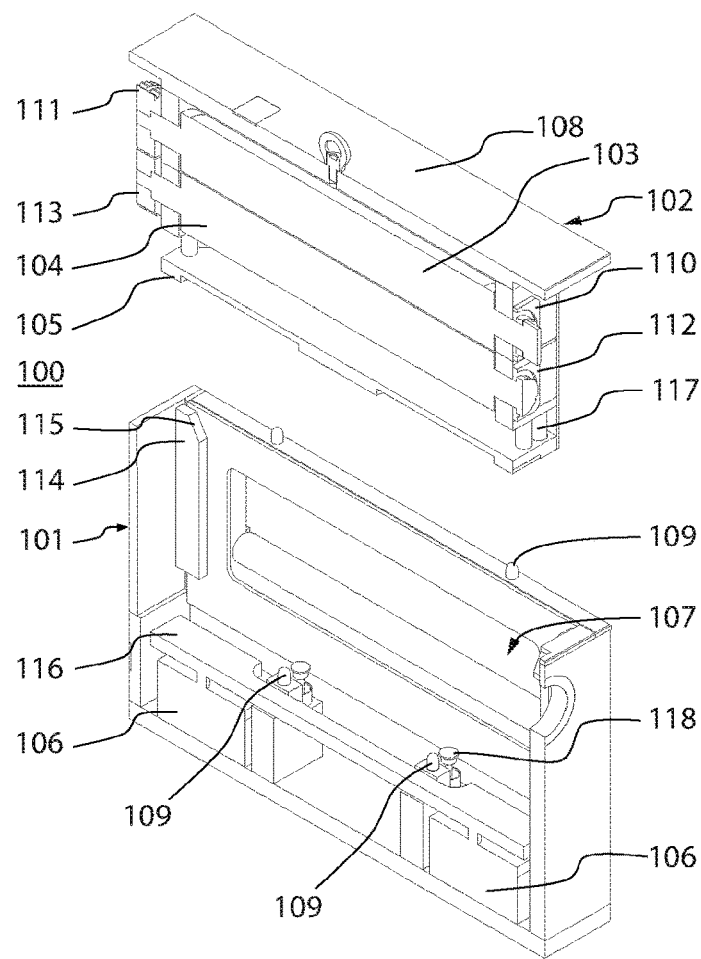

Referring to FIG. 1, this illustrates an example embodiment of an embossing system 100 according to the invention. The embossing system 100 comprises an embossing frame 101 and an embossing cassette 102. The embossing cassette 102 comprises at least two rollers, such as a first roller 103 and a second roller 104, and a body 105, which is configured to hold the first roller 103 and the second roller 104. The first roller 103 and the second roller 104 are removably mounted in the body 105, meaning that they are mounted using mounting means (mounting means not represented in FIG. 1) that may be used to un-mount them and remove them from the body 105 as well, for example in a case where they need to be replaced. The embossing cassette 102 and the elements it contains are represented in a sectional view, which for example shows the first roller 103 and the second roller 104 sectioned in longitudinal direction along their respective rotation axes.

The embossing frame 101 is represented in part only in FIG. 1 in such a manner that its inside may also be seen. For example, it may be seen that the embossing frame 101 comprises a pair of hydraulic or pneumatic jacks 106, which are optional features of the embossing system 100. The embossing frame 101 is configured to removably house the embossing cassette 102, the latter being represented outside of the embossing frame 101 in FIG. 1, in proximity of an upper opening 107 of the embossing frame 101 through which the embossing cassette 102 may be introduced into the embossing frame 101. A lid 108 is configured to close the upper opening 107 once the embossing cassette 102 is introduced entirely into the embossing frame 101. The lid 108 may optionally be integral with the embossing cassette 102 or provided separately therefrom. The lid 108 may comprise body-positioning means.

The embossing frame 101 further comprises at least one embossing-frame positioning means 109, which for example may be embodied as a pin that is integral to or solidly fixed to the embossing frame 101. The embossing-frame position means 109 is configured to cooperate with the corresponding body-positioning means of the embossing cassette 102 (the body-positioning means is not visible in FIG. 1), which in the present example is embodied by at least one hole sized to fit on the corresponding embossing-frame positioning means 109. The embossing-frame positioning means 109 may be numerous and positioned at various spots on the embossing frame 101, for example also at spots that are configured to come into contact with the lid 108 of the embossing cassette 102. In FIG. 1 such embossing-frame positioning means 109 that are configured to fit in corresponding body-positioning means at the lid 108 are represented. Hence, the embossing cassette 102 may be positioned inside the embossing frame 101 in a determined manner thanks to the cooperating embossing-frame positioning means 109 and the body-positioning means. The embossing-frame positioning means 109 may have a conically shaped head that makes introduction in corresponding body-positioning means comparatively easy. A size tolerance between 0.02 mm and 0.06 mm is typically achievable in each axis direction x, y and z.

The body 105 may comprise at at least one of each end of the first roller 103 and the second roller 104 respectively a means for adjusting and correcting which is referenced respectively 110 and 111 for each end of the first roller 103, and 112 and 113 for each end of the second roller 104. Each means for adjusting and correcting 110 to 113 may be enabled to adjust and correct a position of a rotation axis the corresponding first of second roller 103 and 104, inside the body 105, i.e., relative to the body 105.

Figure 2:
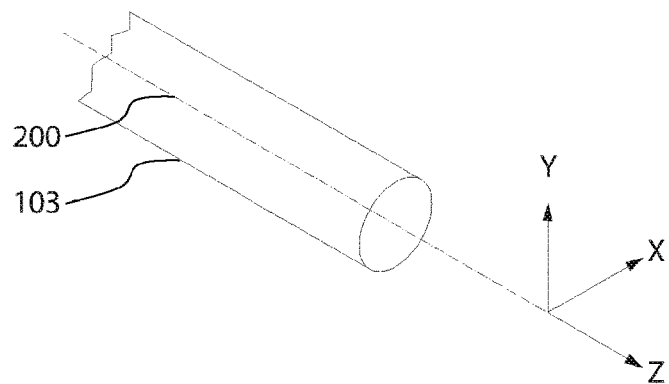

For purposes of explanation, FIG. 2 schematically represents an extremity of the first roller 103 and its rotation axis 200. For reason of better readability, the means for adjusting and correcting 110 is not shown in FIG. 2. The axial direction of the rotation axis 200 is represented by z, while the 2 dimensions of the plane perpendicular to the axial direction are represented by x and y.

Figure 11:
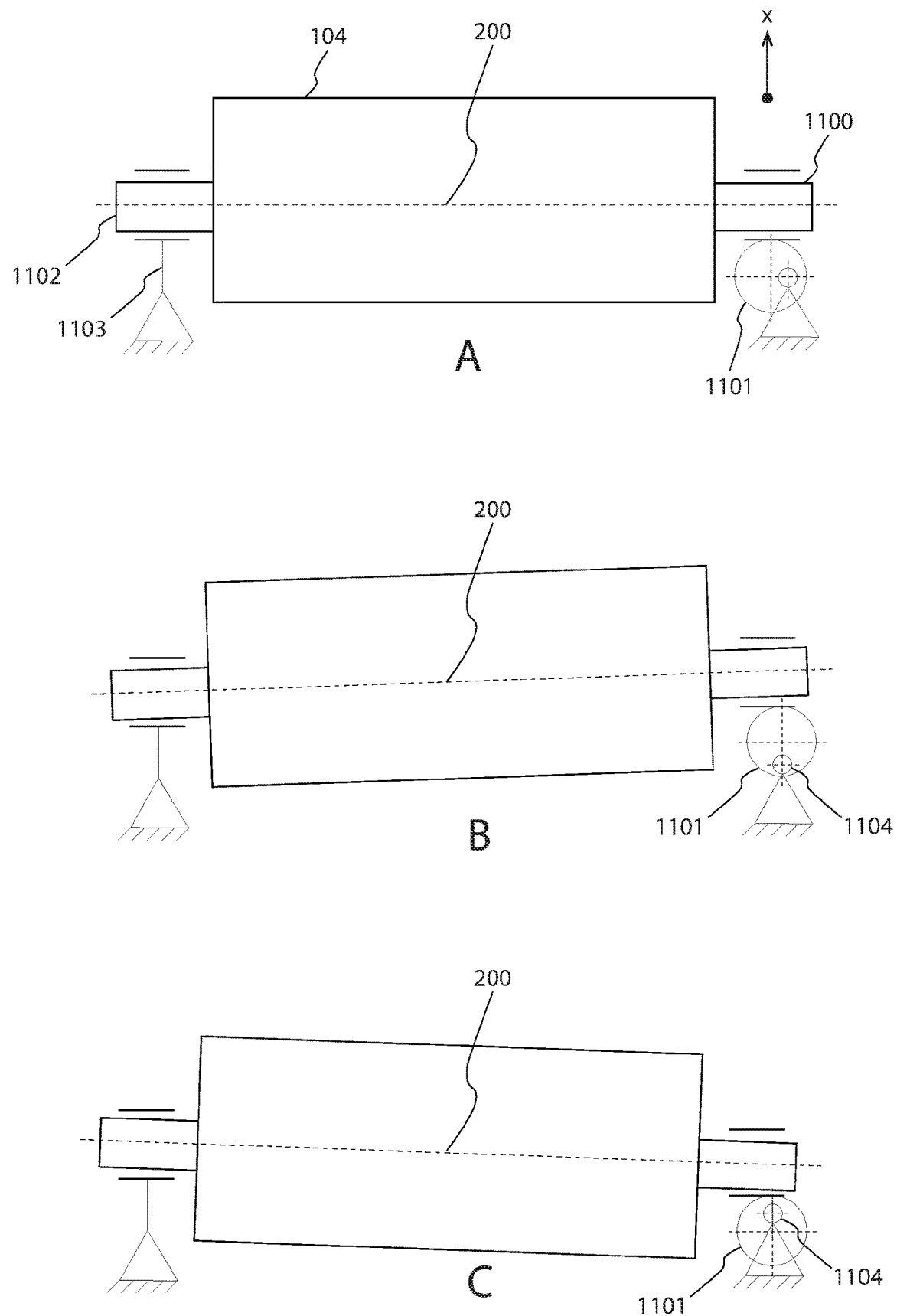

In a particular embodiment represented in FIG. 11, the adjustment and correction of the position of the rotation axis 200 in x-direction at one of the ends 1100 of one of the at least two rollers, e.g., the second roller 104, may for example be adjusted and corrected by ±0.1 mm by means of an off-centered pin 1101. This enables a precision of alignment between the rotation axes of the first roller and the second roller of 0.01 mm, i.e., 2 arcsec. The other of the ends 1102 of the second roller 104 is rotatably fixed at a fixed rotation center device 1103, which is configured to let the rotation axis 200 rotate around the fixed rotation center 1103 around an axis perpendicular to the rotation axis 200 (the former is not represented in FIG. 11. In an upper representation in FIG. 11, labeled A, the off-centered pin 1101 is adjusted in a central position. In a middle representation in FIG. 11, labeled B, the off-centered pin 1101 is adjusted to move the rotation axis 200 in a direction away from a turning center 1104 of the off-centered pin. In a lower representation in FIG. 11, labeled C, the off-centered pin 1101 is adjusted to move the rotation axis 200 in a direction towards the turning center 1101. After adjusting the off-centered pin 1101, this is then locked in the correct position by means of fixture screws (not shown in FIG. 11). Referring now to FIG. 12, this contains a schematic overview of an embossing system 100 with two enlarged portions A and B illustrating mechanisms for adjusting the position of the embossing-roller rotation axis in 2 different directions respectively x and z, according to an example embodiment of the invention. The enlarged portion A represents the function of the off-centered pin 1101, in which this may be adjusted by an adjustment off-centered cam 1200, and then locked in the correct position by means of the fixture screws 1201—4 such fixture screws are illustrated in vicinity of the adjustment off-centered cam 1200.

In addition, in a further particular embodiment represented in FIG. 12, the adjustment and correction of the position of the rotation axis 200 in z-direction at one of the ends of one of the at least two rollers, here the end 1102 of the second roller 104 may be achieved using a notch-disk adjustment mechanism 1202 adjoined to gear wheels 800, as shown in enlarged portion B of FIG. 12, mounted on the respective axis of the second and first rollers 103 and 104. The notch-disk adjustment mechanism 1202 is well known in the art and will therefore not be discussed in greater detail. By the way, the gear wheels 800 are configured to couple the first and second rollers among each other for synchronous rotation and will be described in more detail below. The adjustment mechanism described herein enables to achieve a precision of alignment better than 0.01 mm.

Figure 13:
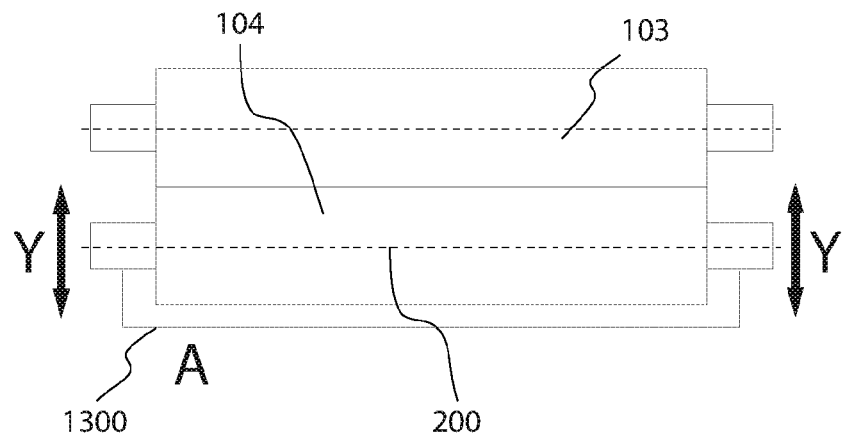
Figure 13:
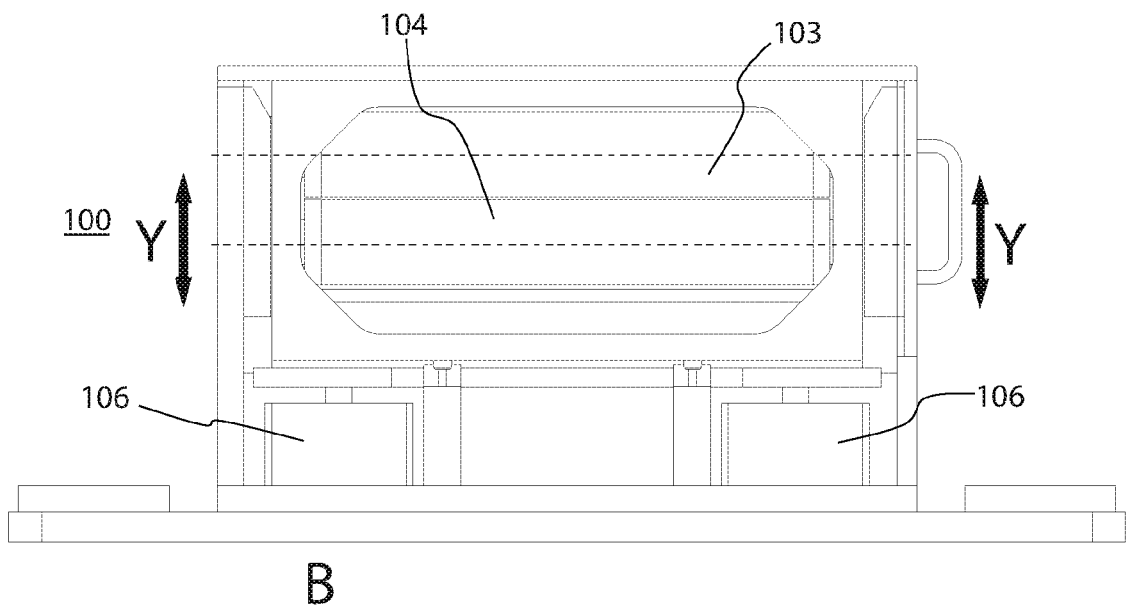
Figure 13:
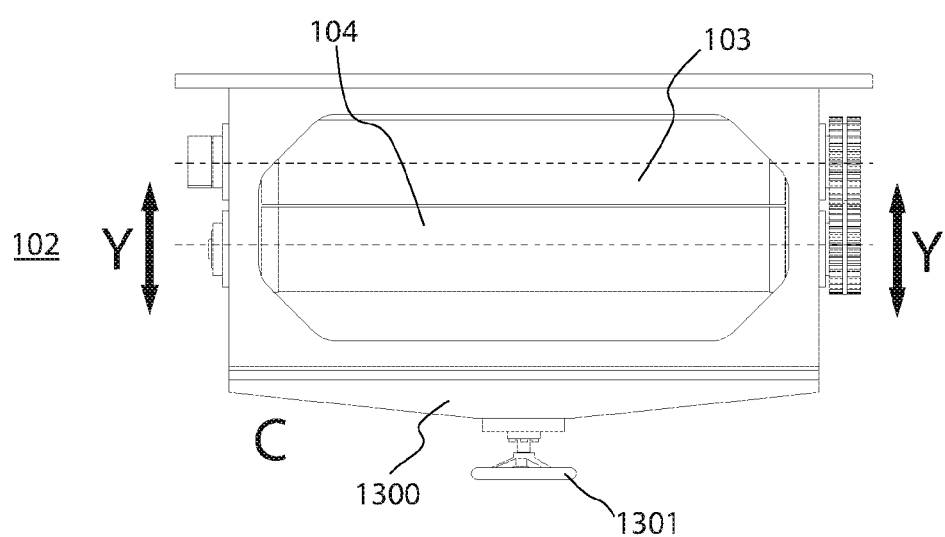
Figure 14:
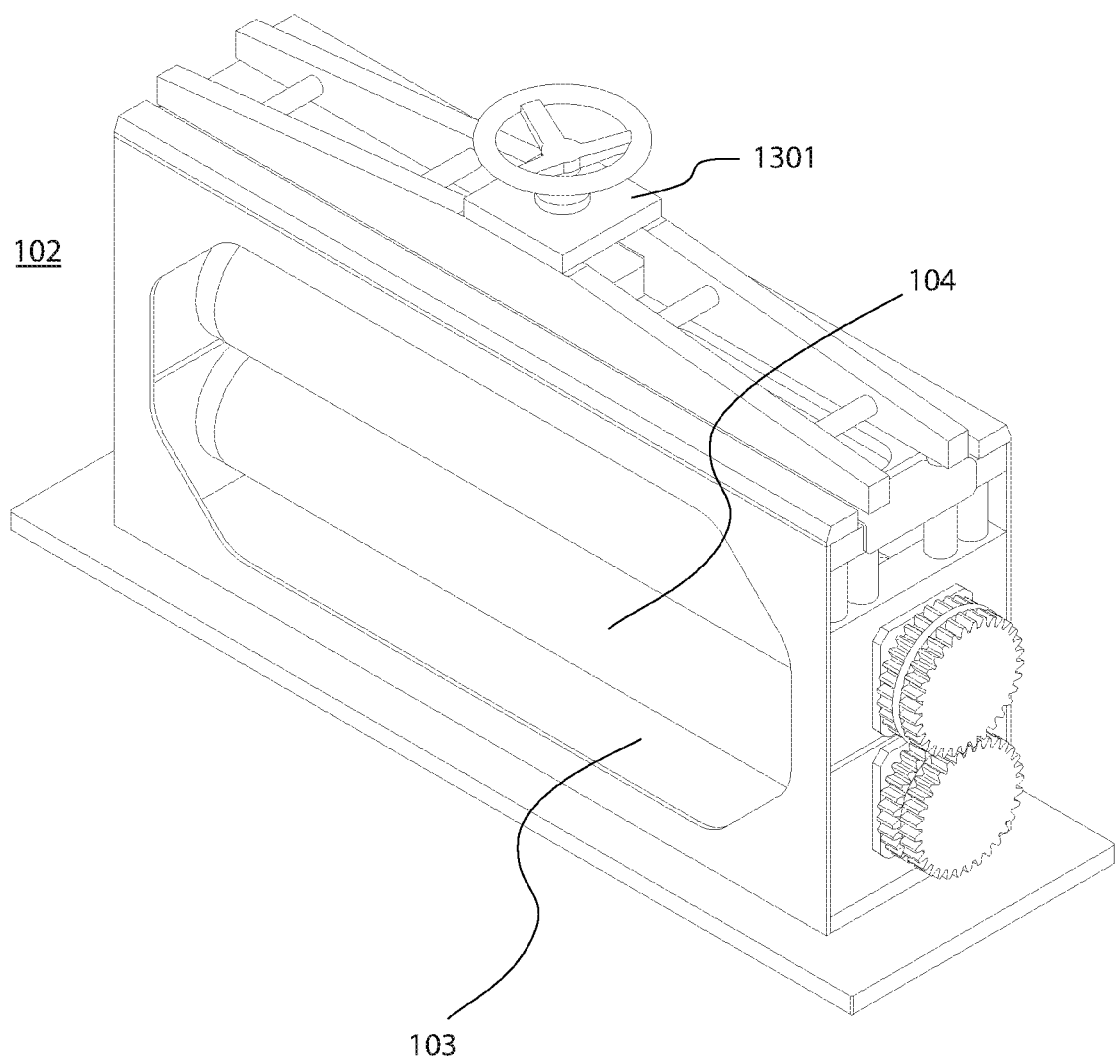
FIG. 14 represents an embossing cassette with a handlebar system according to the example of FIG. 13, and FIG. 15 contains a flowchart illustrating a process for an offline adjustment of an embossing cassette according to an example embodiment of the invention.

Referring now to FIG. 13, this contains illustrations of the embossing system 100 intended to explain an example system for the adjustment in y-direction of the position of the rotation axis 200 of the second roller 104 relative to the first roller 103 inside the embossing cassette 102. This will become clear in view of the middle- and lower-part illustrations labeled B and C in FIG. 13, as well as FIG. 14. In the middle part of FIG. 13, labeled B, the first and second rollers 103 and 104 are shown inside the embossing cassette 102 which itself is housed inside the embossing frame of the embossing system 100. Arrows Y illustrate the direction of adjustments intended to be achieved in y-direction at both ends of the second roller 104. In the lower part of FIG. 13, labeled C, the first and second rollers 103 and 104 are shown in the embossing cassette 102, which is shown extracted from the embossing frame. This lower part further schematically illustrates the handlebar system 1300 together with an adjustment wheel 1301 configured to operate the handlebar system 1300. Referring now to FIG. 14, this represents the embossing cassette 102 of FIG. 13, lower part, in upside-down fashion. In this position, the embossing cassette 102 may conveniently be positioned on a solid working surface (not shown in FIG. 14), such that the adjustment wheel 1301 may be actuated by a user (not represented in FIG. 14) and hence the position of the rotation axis of the second roller 104 relative to the first roller 103 (the latter remains in place) adjusted and corrected in y-direction. The whole embossing cassette 102 may be again turned upside-down after the adjustment, and removably positioned into the embossing frame, while the new adjustment of the axis remains fixed. The example system for the adjustment in y-direction as described herein enables to maintain a tolerance of alignment in a range of 1 µm to 5 µm.

Returning now to FIG. 1, this further illustrates a preferred embodiment with a embossing frame 101 that also comprises a guiding means 114, which is configured to guide the embossing cassette 102 during an insertion of the embossing cassette 102 into the embossing frame 101, in order for the body-positioning means to cooperate with the embossing-frame positioning means 109. Shock absorbers 118 mounted on the embossing frame 101 are configured to absorb a shock that may occur when the embossing cassette 102 is inserted into the embossing frame and reaches an end position inside the embossing frame 101. This allows to substantially eliminate any damage risk at the time of introducing the embossing cassette 102 into the embossing frame 101, be it in vertical and/or in horizontal direction.

Also, the optional hydraulic or pneumatic jacks 106 mounted inside the embossing frame 101 are configured to adjust a counter-pressure between the first roller 103 and 104. The optional hydraulic or pneumatic jack 106 acts onto the pressure transmitting plate 116, which transfers the pressure via standard parts 117 to the means of adjusting 112, 113. In specific cases, for which the embossing is not uniform across a width of the embossing rollers, the hydraulic or pneumatic jacks may be configured to produce a differential pressure between both ends of the rollers, however this is then done without changing the mean embossing pressure. The hydraulic or pneumatic jacks 106 may typically be configured to apply forces up to 2×15 kN.

As explained herein above, the lid 108 is configured to close the opening 107 once the embossing cassette 102 is introduced entirely into the embossing frame 101. The lid 108 may optionally be integral with the embossing cassette 102 or provided separately therefrom.

Once the embossing cassette 102 is housed inside the embossing frame 101 the adjustment mechanisms for the rotations axes of the embossing rollers in the x, y and z axis directions, for example those described in the examples herein above, are hidden to an exterior of the embossing frame 101 because the latter is configured to create an enclosure for the embossing cassette and more particularly the adjustment mechanisms. It therefore becomes impossible to make or change any adjustment to the embossing rollers after completing the housing. Any adjustment that is made to the embossing rollers needs to be made off-line, i.e., while the embossing cassette 102 is removed from the embossing frame 101. This allows the manufacturer of the embossing cassette 102 to make any installation of embossing rollers and corresponding adjustments at the factory and deliver a fully configured embossing cassette 102 for easy and quick installation in the embossing frame 101, which preferably may be installed and remains in the embossing production line of a client. Hence the client does not need to intervene nor be concerned about any adjustments of the roller in the embossing production line. This is particularly remarkable in view of the potential complexity involved in the adjustment of the embossing rollers, especially when the embossing rollers become relatively massive and heavy to handle.

Figure 3:
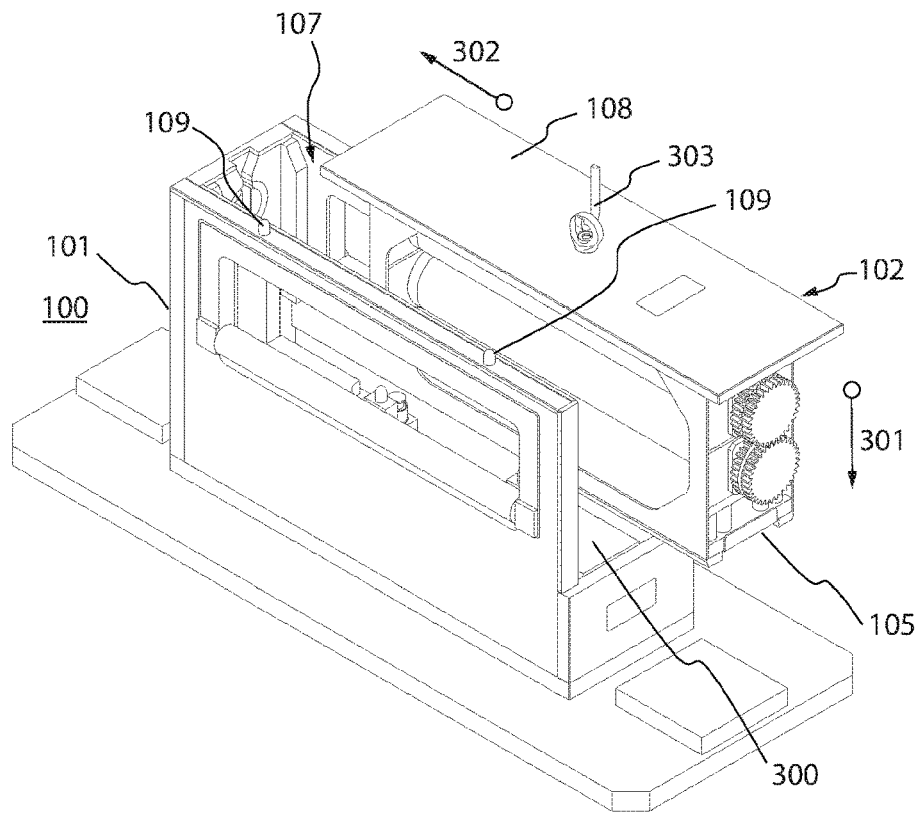
Figure 4:
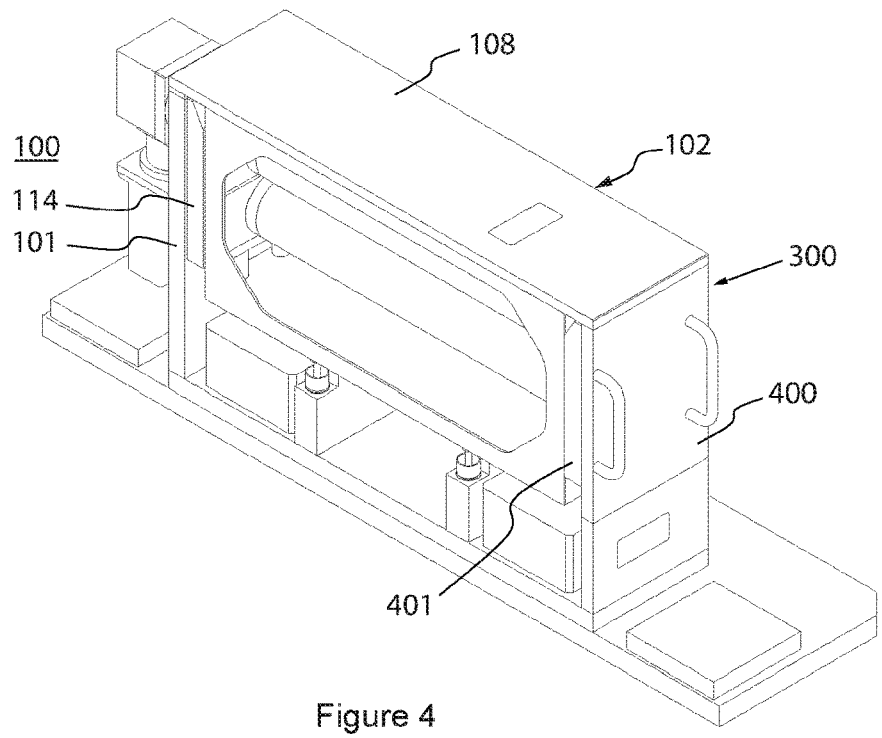

FIG. 3 illustrates a complete version of the embossing frame 101 as opposed to FIG. 1 where it is illustrated only in part in order to better show the inside. In FIG. 3 the embossing cassette 102 is introduced into the embossing frame 101 through the upper opening 107 in a vertical direction 301 and through a side opening 300, adjacent to the upper opening 107, in a horizontal direction 302, possible at the same time. In this example, the lid 108 is integral with the body 105 of the embossing cassette 102, and the embossing cassette 102 may be craned by suspending it at a hook 303 on the lid 108. Once the embossing cassette 102 is positioned inside the embossing frame 101, as illustrated in FIG. 4, a door 400 may be removably mounted to the embossing frame 101 to close the side opening 300. The door 400 may comprise an additional guiding means 401, which together with the guiding means 114 assures a secure positioning of the embossing cassette 102 inside the embossing frame 101.

Figure 5:
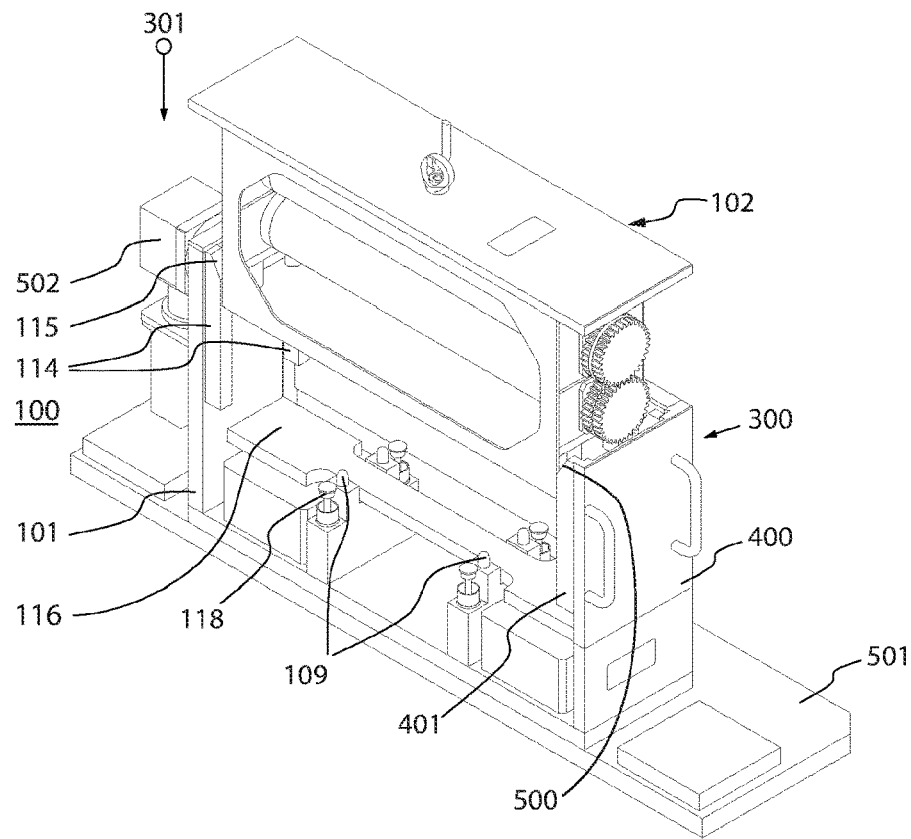

FIG. 5 illustrates an alternative manner of introducing the embossing cassette 102 into the embossing frame 101, wherein the side opening 300 is closed by the door 400 prior to the introduction. In this case the guiding means 114 and the additional guiding means 401 guide the embossing cassette 102 during an insertion of the embossing cassette 102 into the embossing frame 101 along the vertical direction 301, in order for the body positioning means to cooperate with the embossing frame positioning means 109.

Returning now to FIG. 1, the guiding means 114 may comprise at least a slanted surface 115, which is configured to slide on a counterpart element of the embossing cassette 102 (counterpart element not visible in FIG. 1, because located behind the embossing cassette 102 in the viewing perspective of the figure) during the insertion of the embossing cassette 102 in the embossing frame 101. FIG. 5 also illustrates the slanted surface 115 and a further slanted surface 500 of the additional guiding means 401, and makes it apparent that in the illustrated example, the counterpart element of the embossing cassette 102 is simply respectively a surface located on the embossing cassette 102. Using the guiding means according to the invention, a comparatively high precision of positioning with a tolerance inferior to 0.05 mm for rollers having a length of about 1 m may be achieved.

In FIG. 5, the embossing frame 101 is mounted on an optional basis 501, which may be a part of an online-production facility (online-production facility not illustrated in FIG. 5). The basis 501 further carries a drive system 502 which comprises a machine coupling configured to couple the drive system to the embossing cassette 102, once inserted in the embossing frame 101, thereby enabling at least one of the 2 rollers in the embossing cassette 102 to be driven.

Figure 6:
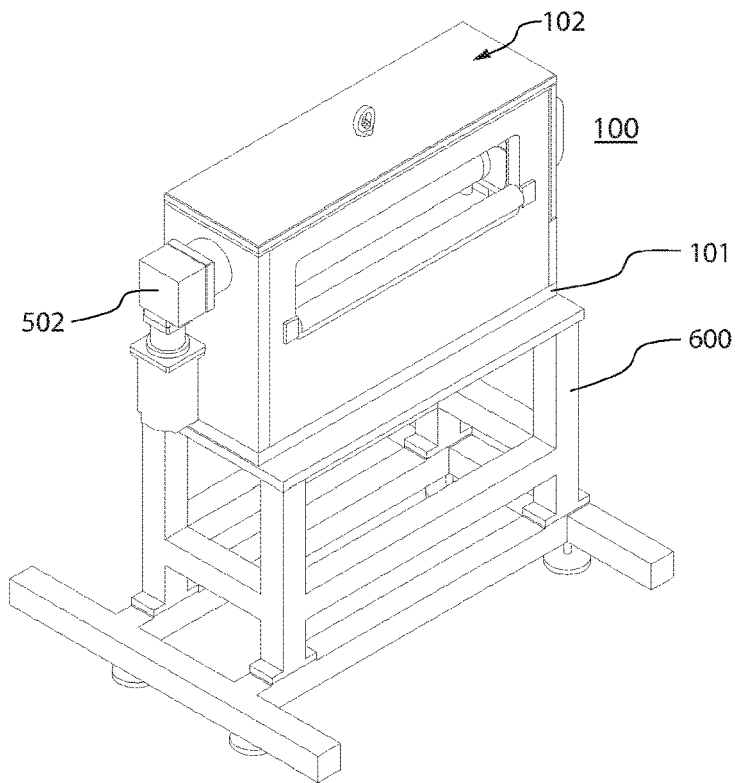
FIG. 6 illustrates an embossing system mounted on a rack, according to a further example embodiment of the invention.

FIG. 6 illustrates the embossing frame 101 with the embossing cassette 102 inserted in it, mounted on a rack 600, which may be part of an online-production facility. In this example the drive system 502 is mounted onto the embossing frame 101 and may be coupled to an external drive motor (not illustrated in FIG. 6) that would enable to drive at least one of the 2 rollers in the embossing cassette 102.

In an embodiment where the embossing frame includes the servo-drive, the coupling interface of the embossing system is unspecific and can be used in arbitrary production lines.

In a preferred embodiment, the at least 2 rollers 103 and 104 have each a length comprised between 100 mm and 5000 mm, but both have a similar length in order to be adjusted to each other.

In a further preferred embodiment, the at least 2 rollers 103 and 104 are heated rollers. This is implemented in a manner well known in the art and is not further illustrated in the figures.

Figure 15:
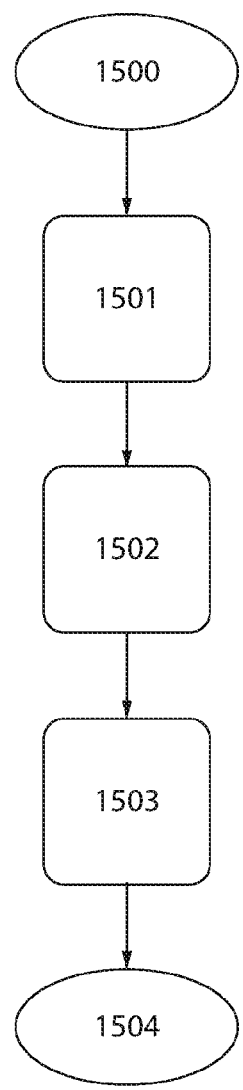

An advantage of the embossing system as presented herein is that the embossing cassette may easily be extracted from the embossing frame, despite the size and weight of the at least 2 rollers. This enables to exchange the embossing cassette in a comparatively short time, and limit production deadtime in an online production setting. The whole process may be executed by a robot or specialized machinery and is illustrated in the flowchart of FIG. 15. Thereby, the embossing cassette 1500 may be extracted 1501 from both front and upper part of the embossing frame as readily illustrated and explained in the above examples. While the embossing cassette may simply be replaced, it is also possible to extract it for servicing of the at least 2 rollers mounted in its body, e.g., for an adjustment of the rollers of the embossing cassette. After an isolating/extracting 1501 of the embossing cassette from the embossing frame in the online production chain, the embossing cassette is in an offline status, meaning that it is not active in the online production line. At that point, the first and the second rollers may be positioned 1502 in the embossing cassette. This may concern the rollers that were already in use prior to extraction of the embossing cassette, in which case the positioning may in fact be a re-positioning, or new rollers that come in replacement. In a next step, the position of each of the rollers mounted in the body may be adjusted and corrected, by adjusting and correcting 1503 at least one of each end of the respective roller a position of a rotation axis at least two of the following: in an axial direction, in at least one of 2 dimensions of a plane perpendicular to the axial direction. This is done by actuating a plurality of adjusting and correcting means at at least one of each of the first and the second embossing roller. One aim of this may be to achieve 1504 a perfect adjustment of the parallelism of the rotation axes. FIG. 2 illustrates the concepts of axial direction and of the plane perpendicular to the axial direction.

In a preferred embodiment, the embossing cassette is subsequently housed inside an embossing frame of the online production chain. Thereby the plurality of adjusting and correcting means is concealed from an outside of the embossing frame.

Figure 7:
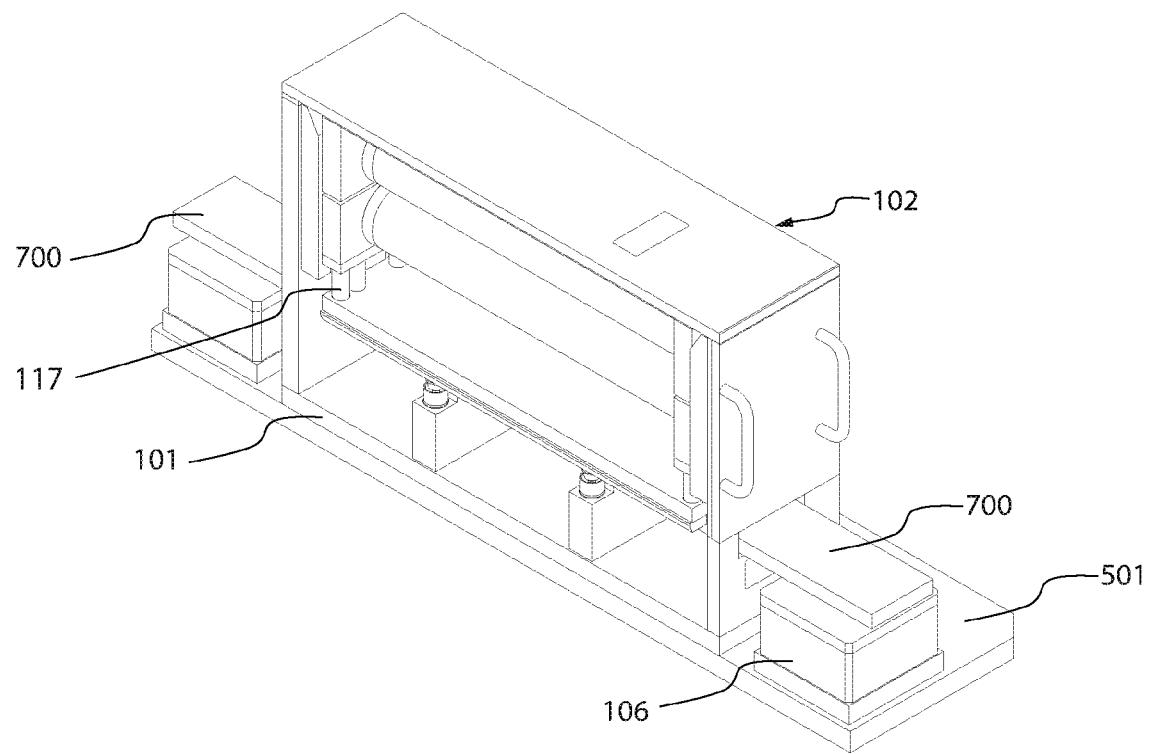
FIG. 7 illustrates an embossing system with optional hydraulic or pneumatic jacks positioned outside of the embossing frame, according to an example embodiment of the invention.

FIG. 7 illustrates an example embodiment of the embossing system comprising the embossing frame 101 and the embossing cassette 102 mounted on the basis 501, but in which the hydraulic jacks 106 are mounted outside the embossing frame 101, directly on the basis 501 too. The forces generated by the hydraulic or pneumatic jacks 106 may be transferred to the rollers by means of lever bars 700.

The embossing system 100 may be configured with sets of at least 2 rollers in which the rollers may have different diameters.

The diameter of each of the at least rollers may typically be in the range of 50 mm to 800 mm.

Figure 8:
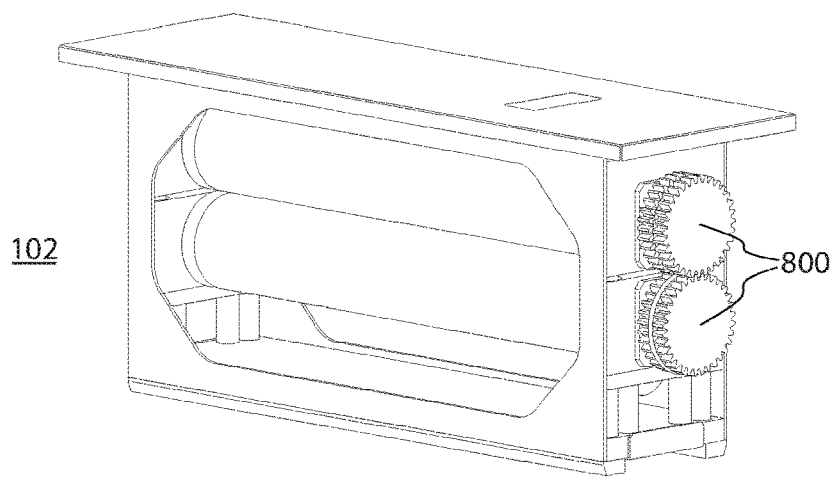
FIGS. 8 to 10 illustrate example embodiments of embossing cassette configuration with rollers having different diameter depending on the case, FIG. 11 contains a schematic illustration of a example embodiment for adjusting a position of an embossing-roller rotation axis in an embossing cassette by mean of an off-centered pin, according to an example embodiment of the invention, FIG. 12 contains a schematic overview of an embossing system with two enlarged portions illustrating mechanisms for adjusting the position of the embossing roller rotation axis in 2 different directions, according to an example embodiment of the invention, FIG. 13 contains a schematic overview of a pair of embossing rollers by themselves, but also inside an embossing system, and an embossing cassette according to an example embodiment of the invention.

FIG. 8 illustrates an example embodiment with rollers having substantially a same diameter. In addition, FIG. 8 shows gear wheels 800 mounted on respective axis of the rollers and configured to couple the rollers among each other. The same diameter may for example be 130 mm.

Figure 9:
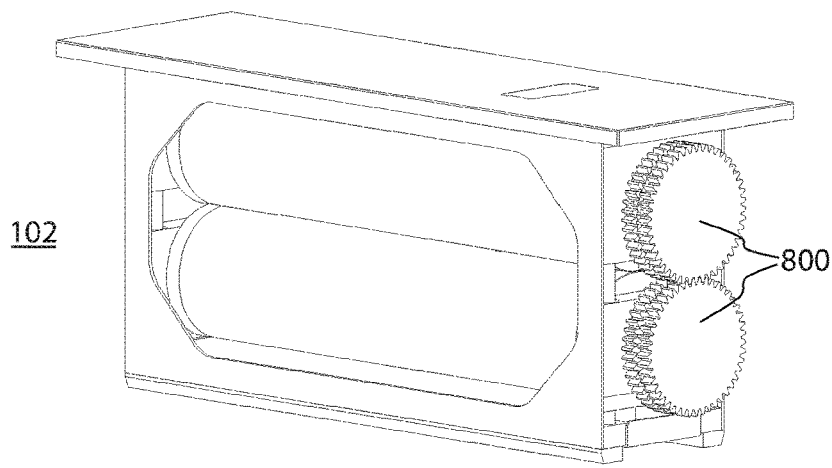

FIG. 9 illustrates a further example with rollers having substantially a same diameter, but a diameter which is larger than that used in FIG. 8. The same diameter may for example be 180 mm.

Figure 10:
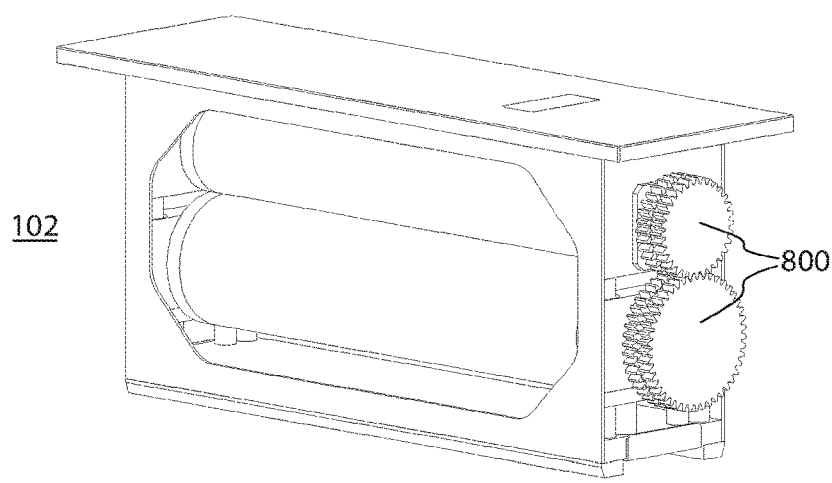

FIG. 10 illustrates a further example with rollers having different diameters from one to the other, one having for example 90 mm diameter, and the other 180 mm diameter.

The rollers may be cambered to achieve a more uniform embossing of structure(s) across the width of the rollers. This is well known in the art and not further illustrated in the figures.

Generally speaking, depending on the needs for the quality of embossing, the embossing rollers may be cylindrical, convex, or concave.

The rollers may comprise stainless steel and be laser-engraved on their surfaces with the embossing structures. In a preferred embodiment, the embossing rollers exhibit a matching synchronized structure design, such as for example a patrix/matrix configuration.

The stainless steel may be hardened in the whole volume or on a superficial layer (<0.5 mm). The so-obtained roller may be sandblasted, peen shot hardened.

In a preferred embodiment, the embossing rollers may receive a hard coating or another surface treatment, in order to increase their wear resistance. For instance, the embossing rollers may be foreseen with a PVD obtained wear reducing coating.

The embossing rollers may be either powder metallurgic or casted, with initial hardness from 55 to 65 HRC and may be laser-engraved with laser sources with laser pulses with wavelength between 265 nm and 1065 nm and pulse durations between 0.2 µs and 20 µs.

Preferably, a synchronicity fine-tuning of the rollers inside the embossing cassette is performed and verified using a dedicated embossing unit, with the internal part not yet mounted in the embossing frame.

The invention claimed is:

1. An embossing system, comprising:
an embossing cassette having a hole defined therein, at least two rollers, and a cassette body configured to hold the at least two rollers, the at least two rollers removably mounted to the cassette body;
an embossing frame having a pin configured to cooperate with the hole of the embossing cassette to position the embossing cassette in a predetermined position inside the embossing frame, the embossing frame configured to removably house the embossing cassette; and
a plurality of adjustment systems configured to adjust and correct a position of a rotation axis of a corresponding roller inside the cassette body, the rotation axis being oriented according to an axial direction, a location of each one of the adjustment systems being at one of each end of the at least two rollers, the plurality of adjustment systems configured to adjust and correct (i) a position of the corresponding roller in the axial direction of the corresponding roller inside the cassette body, (ii) the position of the rotation axis of the corresponding roller in a first direction of a plane perpendicular to the axial direction at one of the ends of the corresponding roller while maintaining the other of the ends of the corresponding roller fixed, and (iii) the position of the rotation axis of the corresponding roller in a second direction of the plane perpendicular to the axial direction and perpendicular to the first direction at one of the ends of the corresponding roller while maintaining the other of the ends of the corresponding roller fixed, the second direction being different from the first direction of the plane perpendicular to the axial direction.

2. The embossing system of claim 1, wherein
the plurality of adjustment systems include an off-centered pin device configured to adjust the position of the rotation axis at one of the at least one of each end of the at least two rollers, in a first one of the first direction of the plane perpendicular to the axial direction, and the second direction different from the first direction of the plane perpendicular to the axial direction, and at an opposite end of the corresponding roller a fixed rotation center, which is configured to enable the rotation axis to rotate around the fixed rotation center around an axis perpendicular to the rotation axis.

3. The embossing system of claim 1, wherein
the plurality of adjustment systems further includes a handlebar coupled to each end of one of the rollers, and an actuator configured to actuate the handlebar to adjust a position of the one of the rollers in one of the first direction of the plane perpendicular to the axial direction, and the second direction different from the first direction of the plane perpendicular to the axial direction.

4. The embossing system of claim 1, wherein
the plurality of adjustment systems is at least partly mounted to the cassette body of the embossing cassette.

5. The embossing system of claim 1, wherein the embossing frame further comprises:
a guide configured to guide the embossing cassette during an insertion of the embossing cassette into the embossing frame, such that the hole is configured to cooperate with the pin.

6. The embossing system of claim 5, wherein
the guide includes at least a slanted surface configured to slide on a counterpart element of the embossing cassette during the insertion of the embossing cassette into the embossing frame.

7. The embossing system of claim 5, wherein
the guide, the hole, and the pin are configured to achieve the predetermined position inside of the embossing frame with a tolerance in a range between 0.02 mm and 0.06 mm.

8. The embossing system of claim 1, further comprising
a hydraulic or pneumatic jack mounted inside of the embossing frame, the hydraulic or pneumatic jack being configured to adjust a counter pressure between the at least two rollers.

9. The embossing system of claim 1, wherein the embossing frame includes at least a first and a second individually removably fixed wall, each respectively enabling an introduction into and removal from the embossing frame of the embossing cassette on a side of the first or second wall.

10. The embossing system of claim 1, wherein
the embossing frame forms an enclosure for the plurality of adjustment systems configured to render the plurality of adjustment systems inaccessible from an outside of the embossing frame when the embossing cassette is housed inside the embossing frame.

11. An embossing cassette comprising:
at least two rollers,
a cassette body configured to hold the at least two rollers, the at least two rollers are removably mounted in the cassette body,
a plurality of devices for adjusting and correcting a position of a rotation axis of the corresponding roller inside the cassette body,
wherein a location of each one of the devices for adjusting and correcting being at one of each end of the at least two rollers, and the devices for adjusting and correcting being configured to adjust and correct in (i) an axial direction of the corresponding roller inside the body, (ii) a first direction of a plane perpendicular to the axial direction at one of the ends of the corresponding roller while maintaining the other of the ends of the corresponding roller fixed, and (iii) a second direction of the plane perpendicular to the axial direction and perpendicular to the first direction at one of the ends of the corresponding roller while maintaining the other of the ends of the corresponding roller fixed, the second direction being different from the first direction of the plane perpendicular to the axial direction.

12. The embossing cassette of claim 11, wherein the plurality of devices for adjusting and correcting are at least partly mounted of the cassette body of the embossing cassette.

13. The embossing cassette of claim 11, wherein the at least two rollers have a length comprised between 100 mm and 5000 mm.

14. The embossing cassette of claim 11, wherein the at least two rollers are configured for embossing web material.

15. The embossing cassette of claim 11, wherein the at least two rollers are heated rollers.

16. A method for an off-line adjustment of an embossing cassette, at least comprising steps of:
extracting the embossing cassette from an online production chain to place the embossing cassette to an offline status;
positioning at least a first and a second embossing roller in a cassette body of the embossing cassette; and
adjusting and correcting a position of at least one of each of the at least first and second embossing rollers mounted in the cassette body of the embossing cassette, by actuating a plurality of devices for adjusting and correcting at at least one of each end of the first and the second embossing roller and thereby adjusting a position of a rotation axis in (i) an axial direction of the corresponding roller inside the body, (ii) a first direction of a plane perpendicular to the axial direction at one of the ends of the corresponding roller while maintaining the other of the ends of the corresponding roller fixed, and (iii) a second direction of the plane perpendicular to the axial direction and perpendicular to the first direction at one of the ends of the corresponding roller while maintaining the other of the ends of the corresponding roller fixed, the second direction being different from the first direction of the plane perpendicular to the axial direction.

17. The method of claim 16, further comprising:
housing the embossing cassette inside an embossing frame of the online production chain, to conceal the plurality of devices for adjusting and correcting from an outside of the embossing frame.

* * * * *